United States Patent
Jin et al.

(10) Patent No.: US 7,074,248 B2
(45) Date of Patent: Jul. 11, 2006

(54) FILTER CLEANING DEVICE OF CYCLONE VACUUM CLEANER

(75) Inventors: Hyoung-jong Jin, Gwangju (KR); Jang-keun Oh, Gwangju (KR)

(73) Assignee: Samsung Gwangju Electronics Co., Ltd., Gwangju (KR)

( * ) Notice: Subject to any disclaimer, the term of this patent is extended or adjusted under 35 U.S.C. 154(b) by 473 days.

(21) Appl. No.: 10/660,800

(22) Filed: Sep. 12, 2003

(65) Prior Publication Data

US 2004/0187253 A1 Sep. 30, 2004

(30) Foreign Application Priority Data

Mar. 31, 2003 (KR) ............... 10-2003-0019951

(51) Int. Cl.
*B01D 45/12* (2006.01)
(52) U.S. Cl. .................. 55/299; 55/304; 55/337; 55/429; 55/DIG. 3
(58) Field of Classification Search .................. 55/296, 55/299, 304, 337, 429, DIG. 3; 15/350, 15/353
See application file for complete search history.

(56) References Cited

U.S. PATENT DOCUMENTS 6,811,584 B1 * 11/2004 Oh .............................. 55/296

FOREIGN PATENT DOCUMENTS

| EP | 1 136 028 A2 | 9/2001 |
|---|---|---|
| JP | 2002-051949 A | 2/2002 |
| JP | 2002-315701 | 10/2002 |

OTHER PUBLICATIONS

British Patent Office, Combined Search and Examination Report issued Jul. 9, 2004 with respect to British Patent Application No. 0400558.3.

* cited by examiner

*Primary Examiner*—Robert A. Hopkins
(74) *Attorney, Agent, or Firm*—Blank Rome LLP

(57) ABSTRACT

A filter cleaning device for a cyclone vacuum cleaner which comprises a cyclone body having a suction port and a discharge port, a dust collecting receptacle connected to the cyclone body for collecting dusts separated from air drawn in through the suction port, and a filter connected to the discharge port and disposed inside the dust collecting receptacle. The filter cleaning device includes a manipulation unit disposed under the filter to approach to, and retreat from the filter. A connection member is interposed between the manipulation unit and the dust-removing ring for moving the dust-removing ring in association with the approaching and retreating movements of the manipulation unit. An elastic spring is interposed between the filter and the manipulation unit for urging the manipulation unit to retreat from the filter.

6 Claims, 8 Drawing Sheets

FILTER CLEANING DEVICE OF CYCLONE VACUUM CLEANER

FIELD OF THE INVENTION

The present invention relates generally to a cyclone type dust collecting apparatus of a vacuum cleaner, and more particularly, to a device for cleaning a filter disposed in a cyclone dust collecting apparatus to filter out minute dust particles from the air after large particles of dust have been separated from the air by a centrifugal force.

BACKGROUND OF THE INVENTION

A filter disposed in a cyclone type dust collecting apparatus of a vacuum cleaner generally filters out minute dust particles from air as air is discharged toward a cleaner body. However, because minute dust particles are gradually accumulated on an outer surface of the filter, there is an inconvenience in that the filter has to be cleaned periodically. Accordingly, various filter cleaning devices have been suggested to remove the dust from the outer surface of the filter in association with opening and closing motion of a dust collecting receptacle of the cyclone type dust collecting apparatus.

Figure 1:
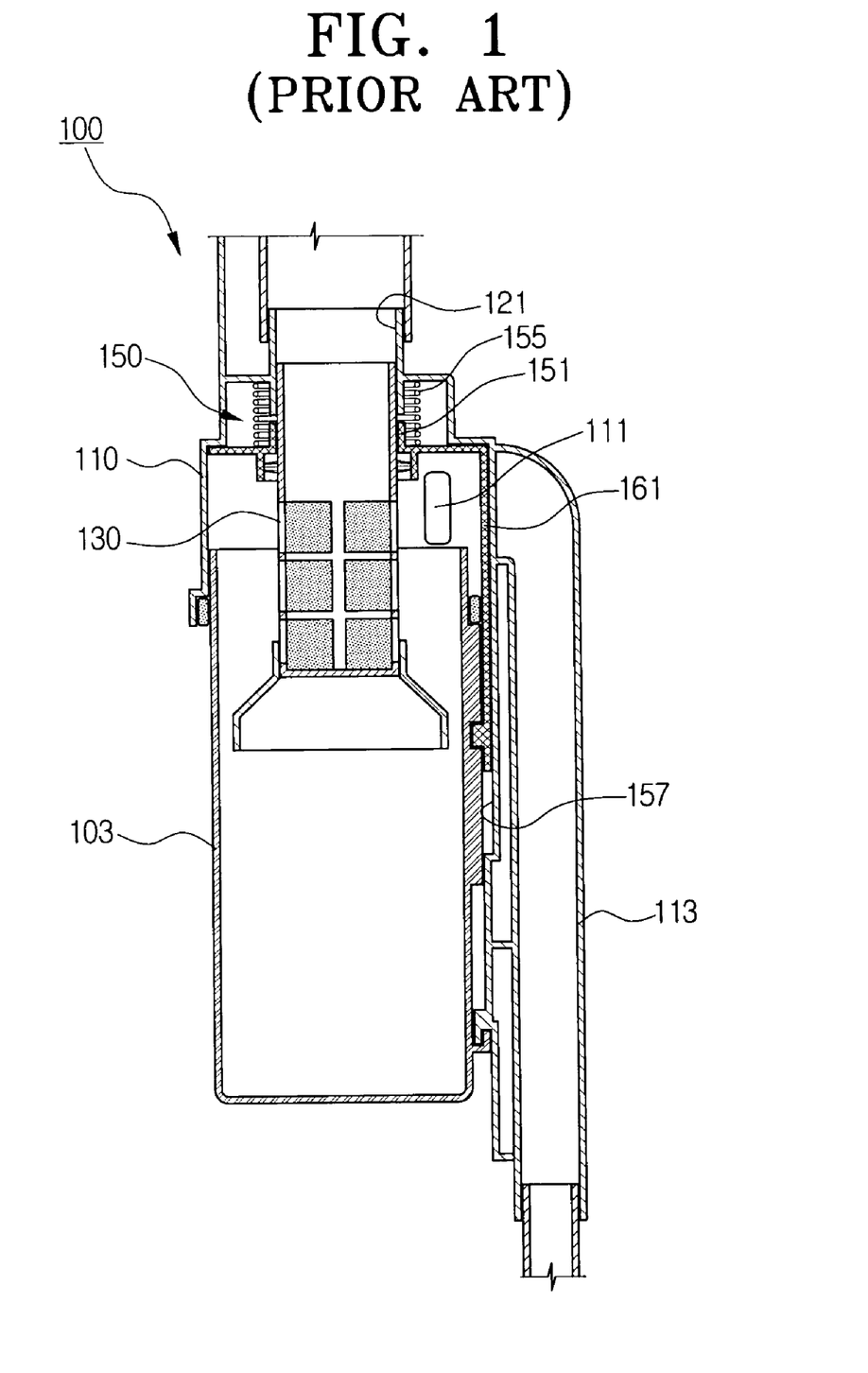
FIG. 1 is a cross-sectional view showing a cyclone type dust collecting apparatus having a conventional filter cleaning device.
Figure 3:
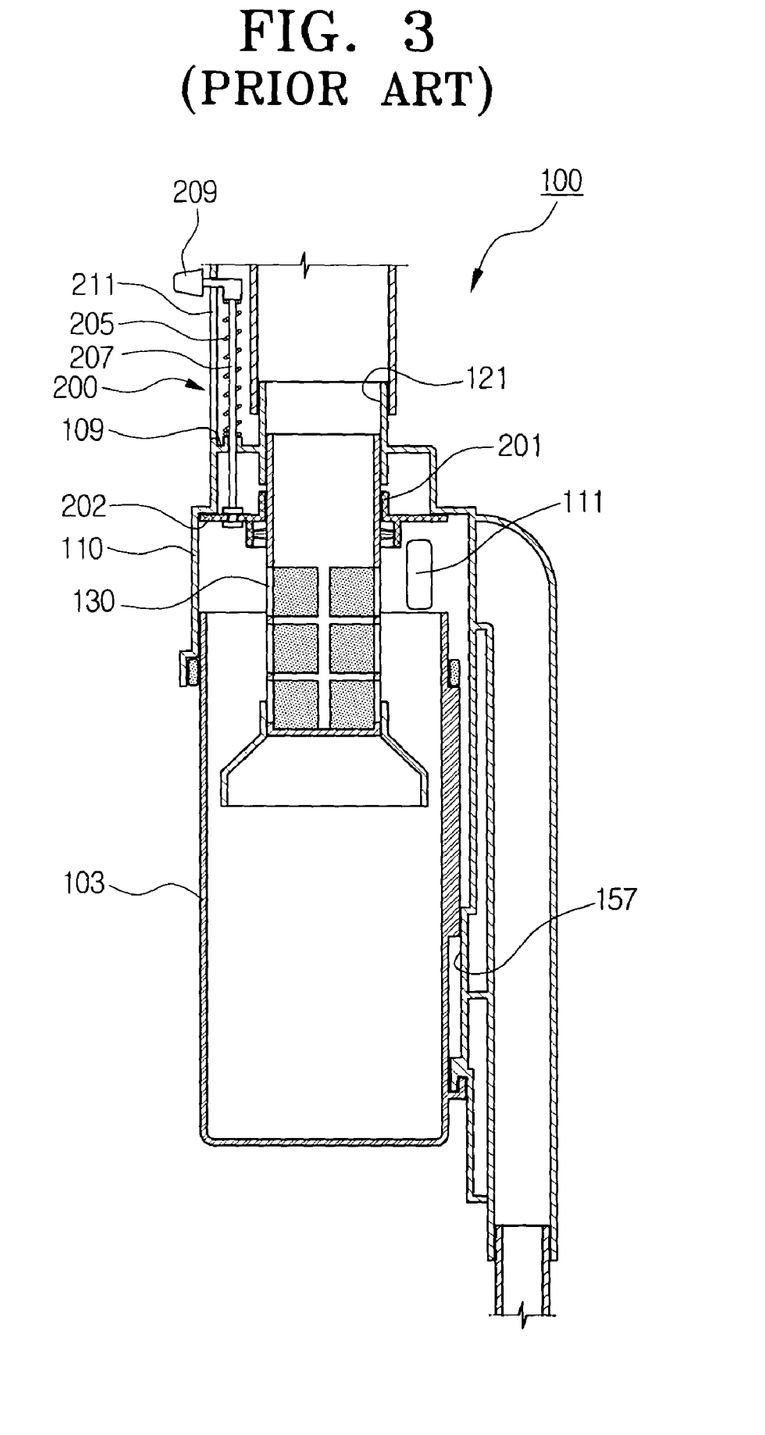
FIG. 3 is a cross-sectional view showing a cyclone type dust collecting apparatus having another conventional filter cleaning device.

FIGS. 1 and 3 are side cross sectional views respectively showing a cyclone type dust collecting apparatus having one of those conventional filter cleaning devices. FIG. 1 shows a disclosure of Japanese Publication No. 2002-315701, and FIG. 3 shows a disclosure of EP 1136028 A2. Referring to FIG. 1, a cyclone type dust collecting apparatus 100 includes a cyclone body 110 having a suction port 111 and a discharge port 121, a dust collecting receptacle 103 removably mounted on the cyclone body 110, a filter 130 installed at the discharge port 121 of the cyclone body 110 and disposed inside the dust-colleting receptacle 103.

Figure 2:
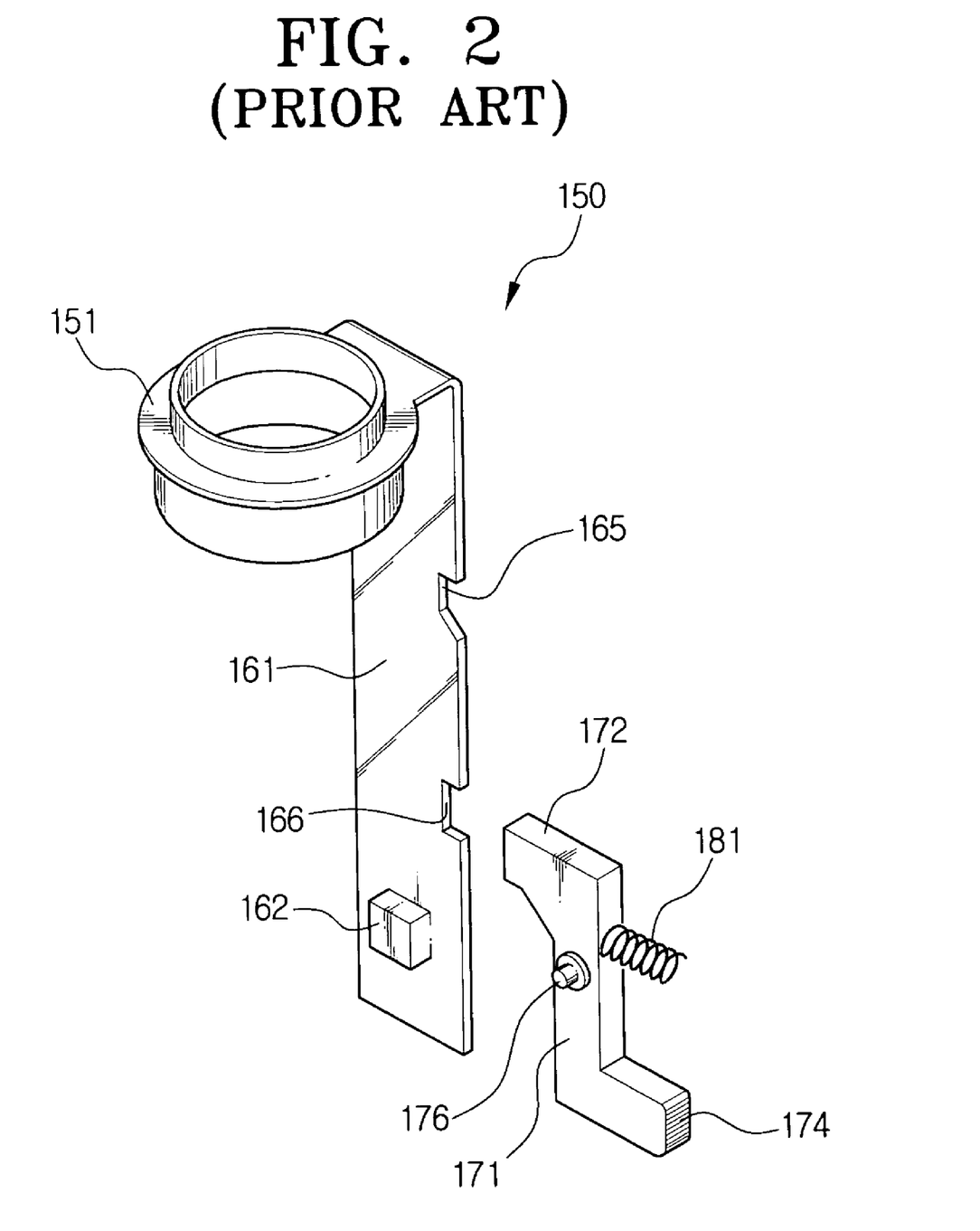
FIG. 2 is an enlarged perspective view of the filter cleaning device of FIG. 1.

A conventional filter cleaning device 150 mounted in the cyclone type dust collecting apparatus 100, referring to FIGS. 1 and 2, includes a dust-removing ring 151 disposed around an outer circumference of the filter 130, an elastic spring 155 disposed elastically pressing the dust-removing rig 151 downwardly, a slider 161 and a locking lever 171 for securely positioning the dust-removing ring 155 at an upper portion of the filter 130. A guide recess 157 for guiding a vertical sliding of the slider 161 is between a connection pipe 113 of the cyclone body 110 and the dust collecting receptacle 103.

The slider 161 is bent and extended downwardly from an outer surface of the dust-removing ring 151 and is received in the guide recess 157 to slide in a vertical direction. The slider 161 has a protrusion 162 fitted in a recess (not shown) of the dust collecting receptacle 103. Due to the cooperation of the protrusion 162 and the recess, the dust collecting receptacle 103 slides integrally with the slider 161. The slider 161 also has a pair of locking recesses 165, 166 depressed along the length of the slider 161 at a predetermined distance from each other.

Meanwhile, the locking lever 171 has a locker 172 corresponding to the locking recesses 165, 166 of the slider 161 and a manipulation portion 174 which a user manipulates. The locking lever 171 rotates about a rotary axis 176 disposed in the guide recess 157, thereby engaging the locker 172 in the locking recesses 165, 166. To this end, on an exterior of the locking lever 171 is disposed a locker spring 181 for elastically pressing the locker 172 toward the locking recesses 165, 166.

In the cyclone type dust collecting apparatus 100 having the conventional filter cleaning device 150 constructed as above, the dust collecting receptacle 103 is separated by pressing the manipulation portion 174 of the locking lever 171. At that time, the filter cleaning device 150 operates together with the dust collecting receptacle 103. That is, when the locking lever 171 is rotated about the rotary axis 176 by pressing on the manipulation portion 174, the locker 172 is outwardly detached from the locker recesses 165, 166 of the slider 161. The compressed spring 155 expands to slide the dust removing ring 151 and the slider 161 downwardly, separating the dust collecting receptacle 103.

The dust-removing ring 151 brushes the dust layer on an outer surface of the filter 130 on sliding downwardly, and thus dust falls down into the dust collecting receptacle 103 and is collected therein. A user disconnects the protrusion 162 of the slider 161 from the recess of the dust collecting receptacle 103 and removes contaminants and dust from the dust collecting receptacle 103. Meanwhile, the dust-removed empty dust collecting receptacle 103 is reconnected with the cyclone body 110 by pressing upwardly.

However, the conventional filter cleaning device 100 has a complicated construction having the slider 161 for moving the dust-removing ring 151 along the outer surface of the filter 130, the elastic spring 155, and the locking lever 171. Further, the guide recess 157 between the cyclone body 110 and the dust collecting receptacle 103 which guides the sliding of the slider 161 and also receives the locking lever 171 for manipulation by the user, makes manufacturing difficult, and causes manufacturing costs to increase. Also, the filter cleaning device 100 is inconvenient to use since it is uneasy to separate/connect the dust-collecting receptacle 103 from/to the cyclone body 110.

Meanwhile, FIG. 3 shows another conventional filter cleaning device 200. The filter cleaning device 200 includes a dust removing ring 201 disposed around an outer surface of a filter 130, a manipulation knob 209 exposed to the outside for the manipulation by a user, and a rod 207 intermediating between the dust-removing ring 201 and the manipulation knob 209. One end of the rod 207 is connected to a rib 202 of the dust-removing ring 201, and the other end of the rod 207 penetrates through an upper flange portion 109 of a cyclone body 110 to connect to the manipulation knob 209. The cyclone body 110 is provided with a slit 211 for guiding movement of the manipulation knob 209 along an up and down direction. Also, an elastic spring 205 is disposed on an outer surface of the rod 207 to be intermediated between the manipulation knob 209 and the upper flange portion 109.

According to this construction, the manipulation knob 209 is urged to an upper portion of the slit 211 due to the recovering force of the elastic spring 205. Accordingly, the dust-removing ring 201 which is connected with the manipulation knob 209 via the rod 207 is also positioned to an upper portion of the filter 130 as shown in FIG. 3. If dust is collected on an outer surface of the filter 130, a user presses the manipulation knob 209 along the slit 211 downwardly. The dust-removing ring 201 moves downwardly along the outer surface of the filter 130, removing the dust collected on the outer surface.

However, the aforementioned filter cleaning device 200 of the cyclone type dust collecting apparatus 100 has disadvantages. That is, the manipulation knob 209 for moving the dust-removing ring 201 along the outer surface of the filter and the rod 207 are unstable in structure and in connection. For example, if dust is collected on the outer surface of the filter 130 to somewhat great amount, it is difficult to downwardly press the manipulation knob 209 and move the dust-removing ring 201. Especially, when excessive force is exerted on the manipulation knob 209, the manipulation knob 209 is likely to be damaged. Accordingly, for fear of breaking the part, a user does not use the manipulation knob 209, but instead separates the dust collecting receptacle 103 from the cyclone body 110 and then manually removes the dust collected on the outer surface of the filter.

SUMMARY OF THE INVENTION

The present invention has been developed in order to solve the above problems in the related art. Accordingly, an aspect of the present invention is to provide a filter cleaning device of a simplified construction but with improved durability, which can easily and cleanly remove minute dust particles collected on an outer surface of a filter disposed in a cyclone type dust collecting apparatus.

Another aspect of the present invention is to provide a filter assembly for a cyclone type dust collecting apparatus which has a simplified construction, requiring reduced amount of manufacturing cost, and is easy to assemble and disassemble.

The above aspects are achieved by providing a filter cleaning device of a cyclone vacuum cleaner which comprises a cyclone body having a suction port and a discharge port, a dust collecting receptacle connected to the cyclone body for collecting dust separated from air drawn in through the suction port, and a filter connected to the discharge port and disposed inside the dust collecting receptacle. The filter cleaning device comprises, a dust-removing ring disposed around an outer surface of the filter and moving along an axial direction, a manipulation unit disposed under the filter to approach to and retreat from the filter, a connection member interposed between the manipulation unit and the dust-removing ring for moving the dust-removing ring in association with the approaching and retreating movements of the manipulation unit, an elastic spring interposed between the filter and the manipulation unit for urging the manipulation unit to retreat from the filter, and an operating bar upwardly protruding from a bottom of the dust collecting receptacle for pressing the manipulation unit as it approaches the filter.

The operating bar presses the manipulation unit as it approaches the filter when the dust collecting receptacle is connected to the cyclone body, and the manipulation unit retreats from the filter by a recovering force of the elastic spring when the dust collecting receptacle is removed from the cyclone body. Accordingly, the dust-removing ring moves along the outer surface of the filter.

It is preferred that the manipulation unit includes an engage recess to engage with an end of the operating bar and a bar guide portion downwardly extended from the engage recess in a radial direction. Preferably, a skirt portion disposed under the filter is connected to the bar guide portion of the manipulation unit.

Also, the connection member includes a connection hole portion placed in the engage recess of the manipulation recess to secure to the manipulation recess by a screw, and a plurality of connection portions protruding from the connection hole in a radial direction and upwardly bent to penetrate through the bar guide portion and the skirt portion of the filter, each connection portion having a connection end connected to the dust-removing ring.

It is preferred that the manipulation unit and the filter are respectively provided with spring fixing portions for securely positioning the elastic spring.

BRIEF DESCRIPTION OF THE DRAWINGS

The above aspects and other features of the present invention will be more apparent by describing a preferred embodiment of the present invention with reference to the accompanying drawings, in which.

DETAILED DESCRIPTION OF THE PREFERRED EMBODIMENT

Hereinafter, the present invention will be described in greater detail with reference to the accompanying drawings.

Figure 4:
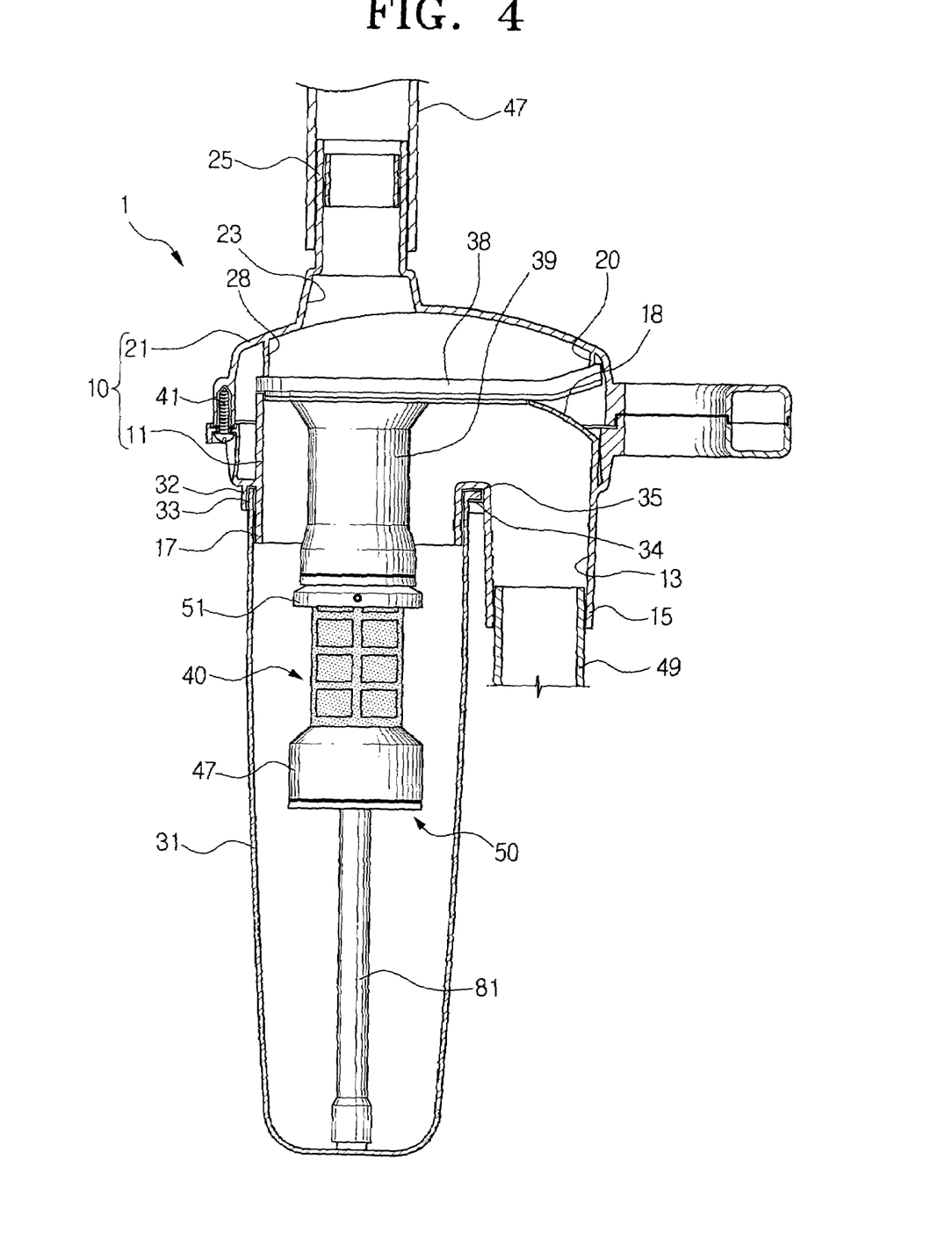
FIG. 4 is a cross-sectional view showing a cyclone type dust collecting apparatus having a filter cleaning device according to a preferred embodiment of the present invention.

FIG. 4 is a cross-section view partially showing a cyclone type dust collecting apparatus where a filter cleaning device according to the present embodiment is mounted. As shown in FIG. 4, a cyclone type dust collecting apparatus 1 includes a cyclone body 10 having a suction port 13 and a discharge port 23, a dust collecting receptacle 31 removably mounted on the cyclone body 10, a filter 40 installed at the discharge port 23 of the cyclone body 10 and disposed inside the dust collecting receptacle 31, and a filter cleaning device 50 for removing dust collected on an outer surface of the filter 40.

The cyclone body 10 is comprised of an upper body 21 wherein the discharge port 23 is disposed, and a lower body 11 wherein the suction port 13 is disposed. The upper and the lower bodies 21, 11 are secured to each other by a plurality of screws 41. A connection pipe 25, toward the discharge side, is upwardly extended from the discharge port 23 which has an upward opening formed in the upper body 21. To the discharge-side of connection pipe 25 is connected a flexible connection pipe 47 connected to a cleaner body (not shown) of a vacuum cleaner.

The lower body 11 has the suction port 23 with a downward opening and a cylinder connection portion 17 with a downward opening parallel to the suction port 13. A connection pipe 15, toward the suction side, is downwardly extended from the suction port 13. To the suction-side of connection pipe 15 is a suction pipe 49 having dust-suction portion (not shown) of the vacuum cleaner. The cylinder connection portion 17 is provided with a connection rib 32 formed on an outer surface thereof, for receiving a connection edge 33 of the dust collecting receptacle 31. The connection rib 32 is provided with a connection slit 34 formed by cutting a part of the connection rib 32 in a horizontal direction.

The dust collecting receptacle 31 is shaped cylindrically having an upward opening, and includes a simplified structure, i.e., in absence of a guide recess 157 (Refer to FIGS. 1 and 3) for a slider and a recess for receiving a protrusion, which is different from the conventional dust collecting receptacle 103 (Refer to FIGS. 1 and 3). The dust collecting receptacle 31 has the connection edge 33 formed on an edge of the opening thereof for receipt in the connection rib 32, and a protrusion 35 is formed in the connection edge 33 for fitting into the connection slit 34. When the dust collecting receptacle 31 is rotated in one direction with the connection edge 33 received in the connection rib 32 of the cylinder connection portion 17, the protrusion 35 is fitted into the connections slit 34. Accordingly, the dust collecting receptacle 31 is removably connected to the cyclone body 10.

Meanwhile, between the upper body 21 and the lower body 11 of the cyclone body 10 is interposed a dirt back-flow preventing plate 38. The dirt back-flow preventing plate 28 has a conical shape and includes a discharge hole (not shown) formed in a center portion thereof. The upper body 21 and the lower body 11 of the cyclone body 10 respectively, have fixed ribs 28, 18 protruding therefrom for supporting the dirt back-flow preventing plate 38. The dirt back-flow preventing plate 38 divides a space within the cyclone body into an upper space and a lower space.

At a discharge hole of the dirt back-flow preventing plate 38 is disposed a filter fixing pipe 39, and the filter 40 is connected to a lower portion of the filter fixing pipe 39. There are various modifications so the filter 40 may be directly connected to the discharge hole of the dirt back-flow preventing plate 38 without the filter fixing pipe 39, or may be directly connected to the discharge port 23 of the upper body 21 without the filter fixing pipe 39 and the dirt back-flow preventing plate 38.

Figure 5:
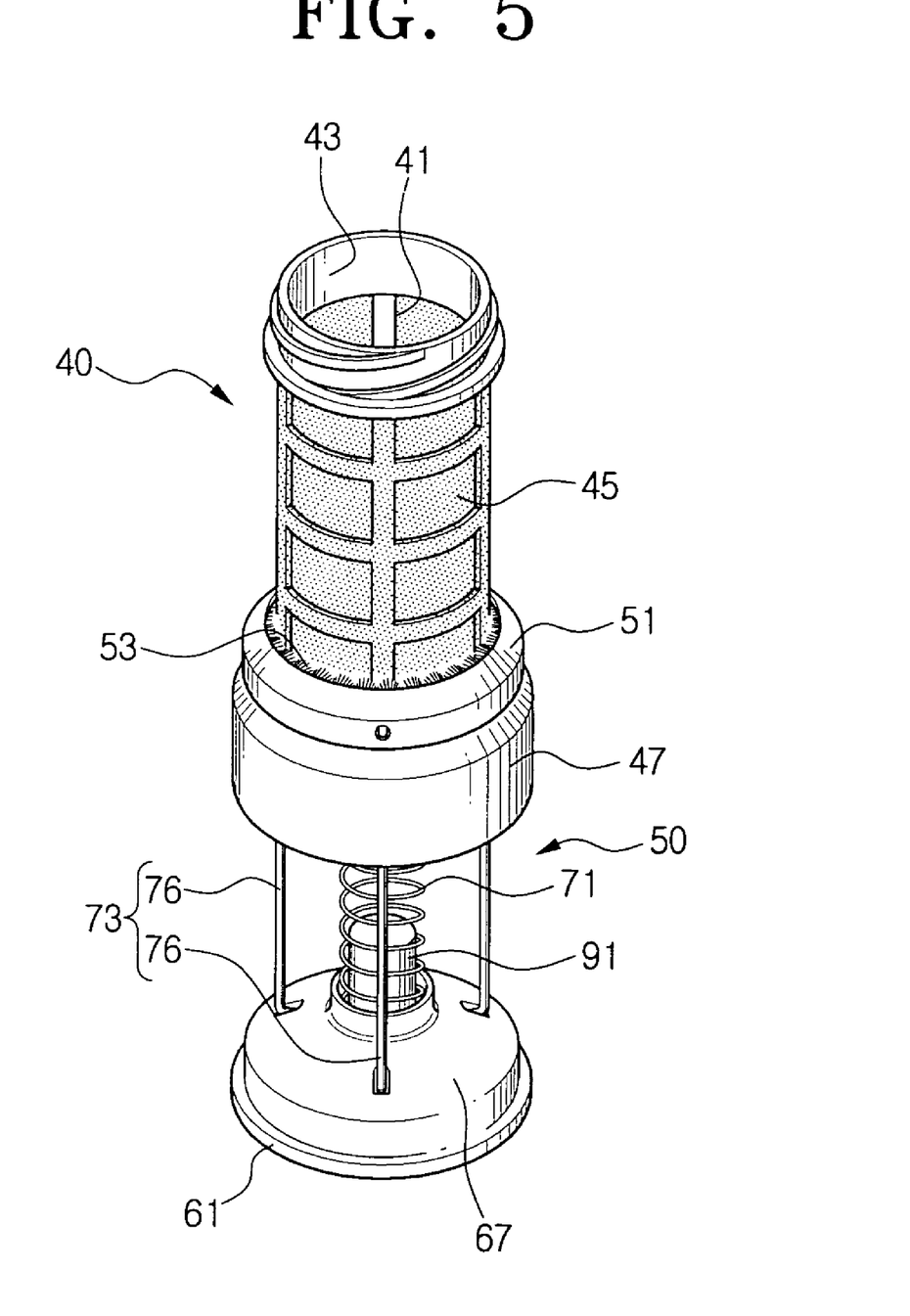
FIG. 5 is an enlarged perspective view of the main part of FIG. 1, which is the filter cleaning device for removing dust collected on the filter and the outer surface of the filter.

As shown in FIG. 5, the filter 40 is cylindrically shaped having an upward opening and a grill portion 41 disposed around an outer circumference thereof. The grill portion 41 may include a plurality of filter apertures, for filtering minute dust particles from air itself. For more effective filtering, it is preferred that the grill portion 41 be constructed of, a plurality of openings and a net-shaped filtering member 45 covering around the openings. The upward opening of the filter 40 forms a discharge opening 43 in fluid communication with the discharge port 23 to discharge air after filtering through the grill portion 41.

Figure 6:
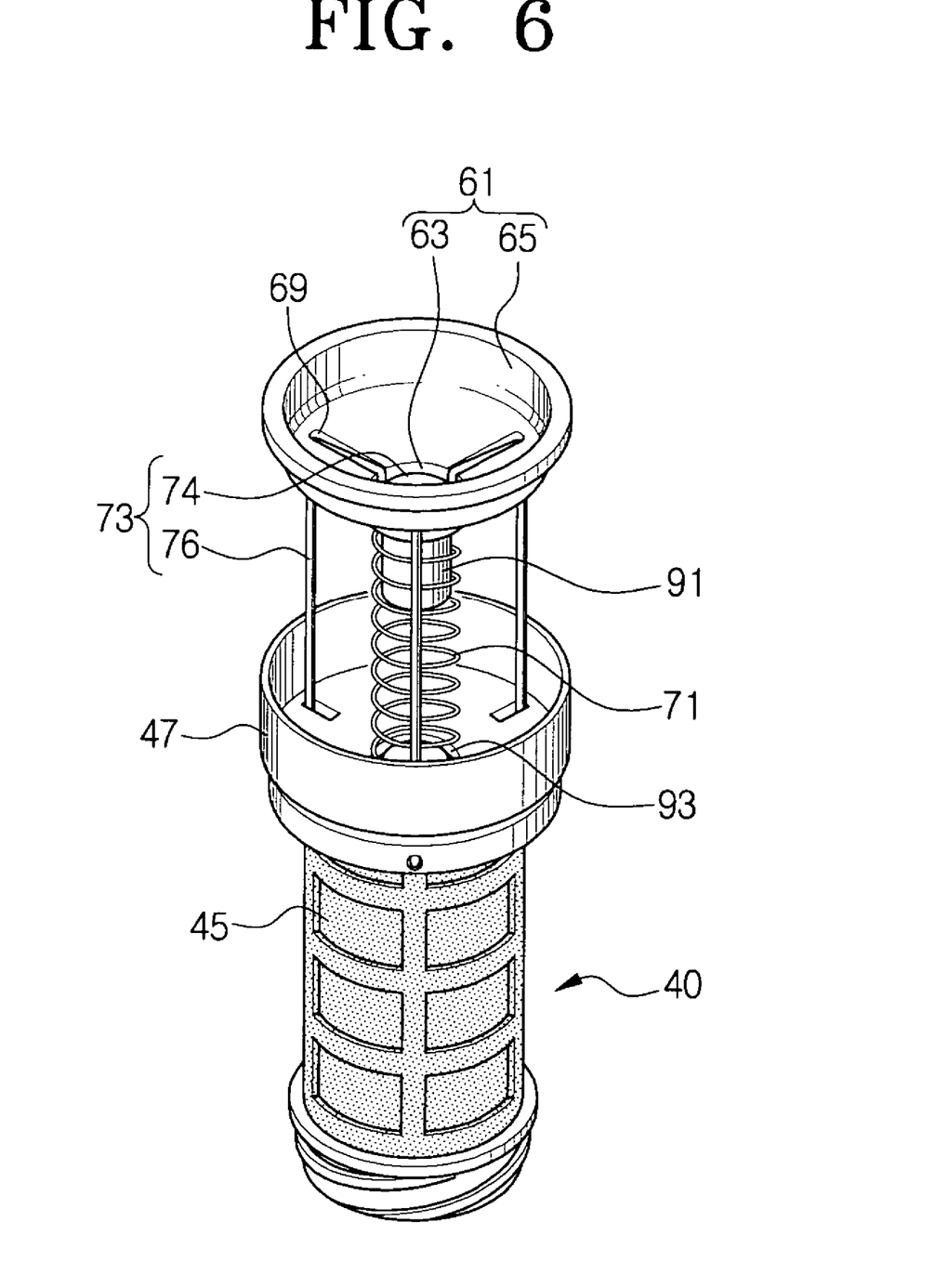
FIG. 6 is a perspective rear view of FIG. 5.

Meanwhile, FIG. 5 is an exploded perspective view enlarging the main part of FIG. 4, and FIG. 6 is a rear view of FIG. 5 showing the filter cleaning device 50 for removing the dust collected on the filter 40 and the outer surface of the filter 40 in more detail. As shown in FIGS. 5 and 6, the filter cleaning device 50 includes a dust-removing ring 51 disposed around the outer surface of the filter 40, a manipulation unit 61 for moving the dust-removing ring 51 vertically along the outer surface of the filter 40, and an operating bar 81 (Refer to FIG. 4) disposed in the dust-removing receptacle 31 for operating the manipulation unit 61. The filter cleaning device 50 further includes an elastic spring 71 interposed between the manipulation unit 61 and the filter 40 and a connection member 73 for intermediating between the manipulation unit 61 and the dust-removing ring 51.

Like the conventional dust-removing ring as shown in FIGS. 1 to 3, the dust removing ring 51 is disposed around the outer surface of the filter 40, and ascends and descends along an axial direction. It is preferred that a brush 53 is disposed around an inner circumference of the dust-removing ring 51. The brush 53 moves together with the dust-removing ring 51 to brush and remove dusts from the outer surface of the filter 40.

The manipulation unit 61 is hemispherically shaped and disposed under the filter 40 with a predetermined distance therefrom. The manipulation unit 61 includes an engage recess 63 defined in a center portion of a concaved inner surface of the manipulation unit 61 and a bar guide portion 65 downwardly extended from the engage recess 63 in a radial direction. The engage recess 63 receives therein an end 83 of the operating bar 81, while the bar guide portion 65 guides the end 83 of the operating bar 81 to the engage recess 63. In a center of the engage recess 63 is defined a connection recess.

The manipulation unit 61 has a convex surface 67 opposite to the filter 40 to include an access to the filter 40. The filter 40 has a skirt portion for partially covering the manipulation unit 61. The skirt portion 47 outwardly protrudes from a lower edge of the filter 40 and is extended toward the manipulation unit 61. The skirt portion 47 functions not only to cover the manipulation unit 61 but also to prevent the dust-removing ring 51 from descending excessively.

Meanwhile, the connection member 73 includes a connection hole portion 74 connected to the manipulation unit 61, three connection portions 76 branched from the connection hole portion 74 towards the dust-removing ring 51, and connection ends 75 of the connection portions 76 connected to the dust-removing ring 51. The connection hole portion 74 is placed in the engage recess 63 of the manipulation unit 61 and has a penetrating hole formed in a center thereof corresponding to the connection recess of the manipulation unit 61. The connection hole portion 74 is secured to the manipulation unit 61 by a screw 79 (Refer to FIG. 7) fastened into the connection recess formed in the engage recess 63 of the manipulation portion 61, penetrating through the penetrating hole upwardly.

The connection portions 76 are extended from the connection hole portion 74 in a radial fashion to penetrate through the bar guide portion 65 of the manipulation unit 61 and the skirt portion 47 of the filter 40. The manipulation unit 61 is provided with three grooves 69 formed in the concaved inner surface thereof, for securely positioning the respective connection portions 76 of the connection member 73. The connection ends 75 of the connection portions 76 are connected to the dust-removing ring 51, so that the manipulation unit 61 and the dust-removing ring 51 move integrally with each other.

Meanwhile, the elastic spring 71 is interposed between the manipulation unit 61 and the filter 40 in the skirt portion 47 of the filter 40. The manipulation unit 61 is provided with a spring fixing portion 91 protruding from a convex outer surface thereof toward the filter 40. A filter fixing portion 93 is disposed in a lower dented portion of the filter 40. The spring fixing portion 91 and the filter fixing portion 93 are fixedly connected with both ends of the elastic spring 71. The manipulation unit 61 is separated from the filter 40 by a recovering force of the elastic spring 71.

Figure 7:
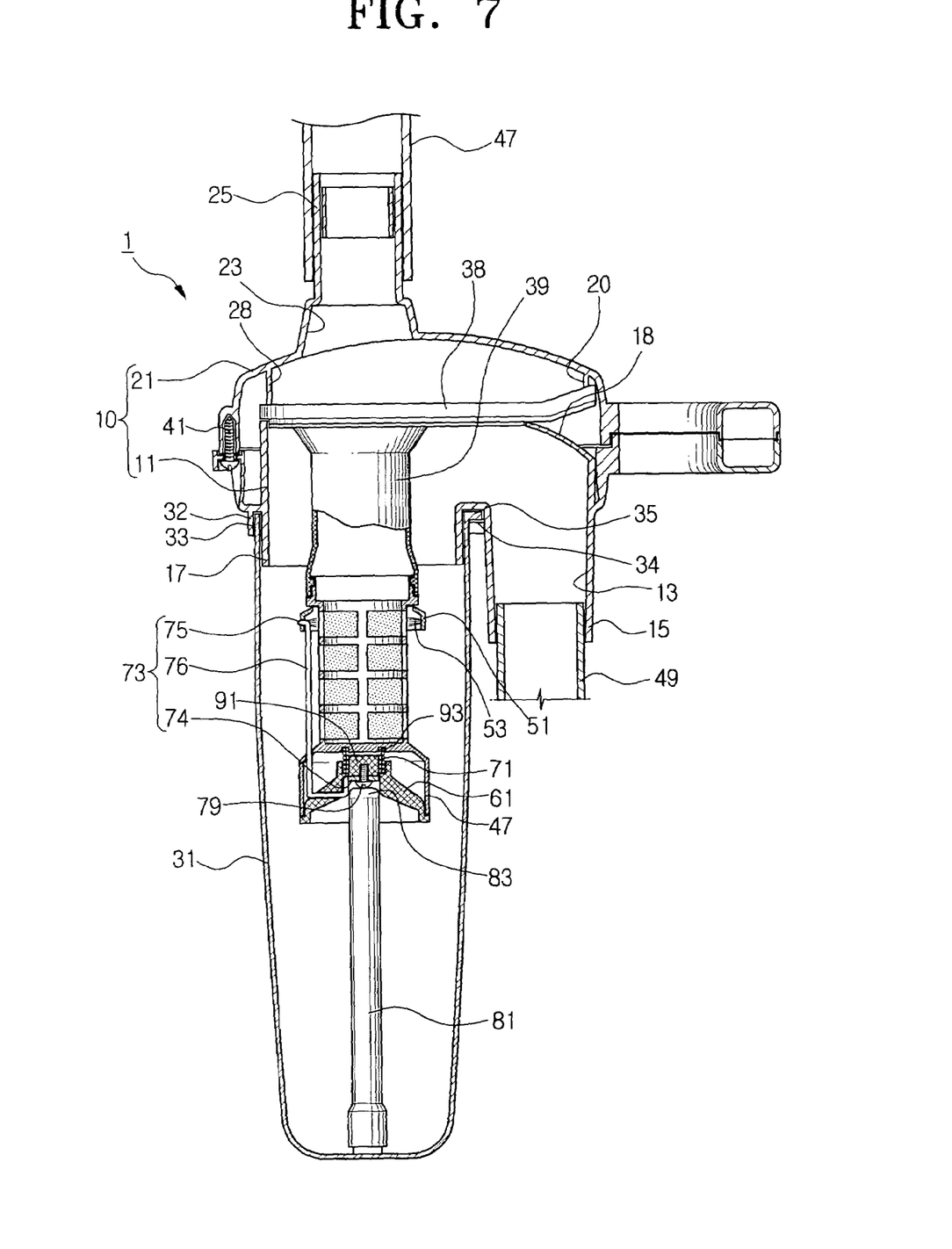
FIGS. 7 and 8 are cross-section views showing respectively the filter cleaning device of the present invention disposed in the cyclone type dust collecting apparatus to explain operations thereof.
Figure 8:
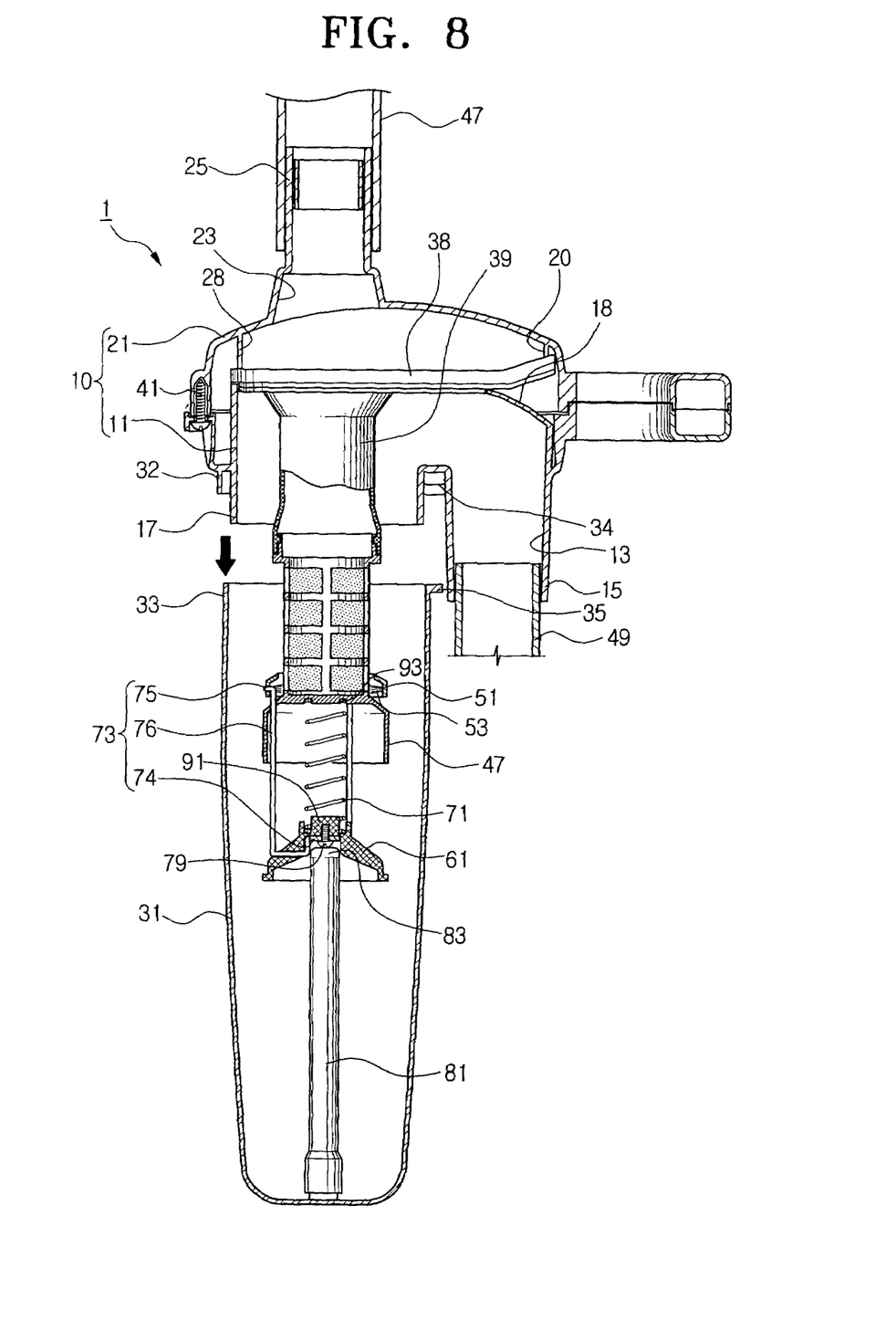

As shown in FIGS. 7 and 8, the operating bar 81 upwardly protrudes from a bottom of the dust collecting receptacle 31 in an axial direction. The operating bar 82 is formed integrally with the dust collecting receptacle 31 by injection molding or is individually formed and then assembled with the dust collecting receptacle 31. The operating bar 81 has one end 83 guided by the bar guide portion 65 of the manipulation unit 61 and received and engaged with the engage recess 63.

When the operating bar 81 is pressed upwardly, the manipulation unit 61 approaches the filter 40. Concurrently, the dust-removing ring 51 moves upwardly along the outer surface of the filter 40 to be positioned at an upper portion of the filter 40. Meanwhile, when the pressure on the operating bar 81 is released, the manipulation unit 61 is separated from the filter 40 by the recovering force of the elastic spring 71. At this time, the dust-removing ring 51 moves downwardly along the outer surface of the filter 40 to be positioned at a lower portion of the filter 40. By the movements of the dust-removing ring 51 as above, the dust collected on the outer surface of the filter 40 is removed.

In the cyclone type dust collecting apparatus 1 including the filter cleaning device 50 with the above-described construction, air, including dust and dirt drawn into the suction pipe 49, flows through the suction port 13 in a tangential direction. The drawn air swirls about the filter 40, generating a cyclone. At this point, the dirt and large-sized dust particles are separated from air by a centrifugal force of the whirling air. However, air still contains minute dust particles even after the dirt removal by centrifugal force. Such minute dust particles are filtered out at the filter 40 so only 'clean' air is discharged through the discharge port 23.

Meanwhile, the dirt and dust separated by the centrifugal force and collected in the dust collecting receptacle 31 are removed by separating the dust collecting receptacle 31 itself from the cyclone body 10 and emptying it. The dust collecting receptacle 31 is easily separated from the cyclone body 10 as it is rotated in one direction as described above, and thus, released from the connection of the protrusion 35 and the connection slit 34. Concurrently, the manipulation unit 61 is separated from the filter 40 by the recovering force of the elastic spring 71. The dust-removing ring 51 connected through the connection member 73, moves downwardly along the outer surface of the filter 40.

At this point, the dust-removing ring 51 in a downward movement, removes the dust collected on the outer surface of the filter 40. The dust is effectively removed by the brush 53 disposed around the inner circumference of the dust-removing ring 51. The dust removed by the dust-removing ring 51 is collected on the dust collecting receptacle 31, and is easily removed by emptying the dust collecting receptacle 31.

In re-connecting the dust collecting receptacle 31 to the cyclone body 10, the operating bar 81 is guided by the bar guide portion 65 of the manipulation unit 61 and is connected to the engage recess 63. A user presses the dust collecting receptacle 31 upwardly, the manipulation unit 61 is subjected to pressure and accordingly, approaches the filter 40. The dust-removing ring 51 moves upwardly along the outer surface of the filter 40 to be positioned at an upper portion of the filter. At this point, by fitting the protrusion 35 of the dust collecting receptacle 31 into the connection slit 34, the vacuum cleaner is in a cleaning mode.

According to the present embodiment, the filter cleaning device 50 has a simplified construction and improved durability, and it can easily and cleanly remove the minute dust particles collected on the outer surface of the filter 40. The simplified construction enables the manufacturing costs to be reduced and also simple assembly and disassembly.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A filter cleaning device of a cyclone vacuum cleaner which comprises a cyclone body with a suction port and a discharge port, a dust collecting receptacle connected to the cyclone body for collecting dusts separated from air drawn in through the suction port, and a filter connected to the discharge port and disposed inside the dust collecting receptacle, the filter cleaning device comprising:
   a dust-removing ring disposed around an outer surface of the filter and moving along an axial direction;
   a manipulation unit disposed under the filter to approach to, and retreat from the filter;
   a connection member interposed between the manipulation unit and the dust-removing ring, for moving the dust-removing ring in association with the approaching and retreating movements of the manipulation unit;
   an elastic spring interposed between the filter and the manipulation unit, for urging the manipulation unit to retreat from the filter; and
   an operating bar upwardly protruding from a bottom of the dust collecting receptacle, for pressing the manipulation unit towards the filter.

2. The filter cleaning device of claim 1, wherein the operating bar presses the manipulation unit towards the filter when the dust collecting receptacle is connected to the cyclone body, and the manipulation unit retreats from the filter by a recovering force of the elastic spring when the dust collecting receptacle is removed from the cyclone body.

3. The filter cleaning device of claim 1, wherein the manipulation unit comprises:
   an engage recess engaged with an end of the operating bar and a bar guide portion downwardly extended from the engage recess in a radial direction; and
   a skirt portion disposed under the filter connected to the bar guide portion of the manipulation unit.

4. The filter cleaning device of claim 2, wherein the manipulation unit comprises:
   an engage recess engaged with an end of the operating bar, and a bar guide portion downwardly extended from the engage recess in a radial direction; and
   a skirt portion disposed under the filter connected to the bar guide portion of the manipulation unit.

5. The filter cleaning device of claim 3, wherein the connection member comprises:
   a connection hole portion placed in the engage recess of the manipulation recess secured to the manipulation recess by a screw; and
   a plurality of connection portions protruding from the connection hole in a radial direction and bent upwardly to penetrate through the bar guide portion and the skirt portion of the filter, each connection portion having a connection end connected to the dust-removing ring.

6. The filter cleaning device of claim 1, wherein the manipulation unit and the filter are respectively provided with spring fixing portions for securely positioning the elastic spring.

* * * * *